(No Model.)

J. M. KEITH.
FARM GATE.

No. 498,124. Patented May 23, 1893.

Witnesses:
F. L. Ourand
W. L. Coombs

Inventor:
Jesse M. Keith,
by Louis Bagger & Co.
Attorneys.

THE NORRIS PETERS CO., PHOTO-LITHO., WASHINGTON, D. C.

UNITED STATES PATENT OFFICE.

JESSE M. KEITH, OF MURRAY, IOWA.

FARM-GATE.

SPECIFICATION forming part of Letters Patent No. 498,124, dated May 23, 1893.

Application filed February 14, 1893. Serial No. 462,276. (No model.)

*To all whom it may concern:*

Be it known that I, JESSE M. KEITH, a citizen of the United States, and a resident of Murray, in the county of Clarke and State of Iowa, have invented certain new and useful Improvements in Farm-Gates; and I do hereby declare that the following is a full, clear, and exact description of the invention, which will enable others skilled in the art to which it appertains to make and use the same, reference being had to the accompanying drawings, which form a part of this specification.

My invention relates to improvements in farm gates of that character or description in which the slats and bars are pivoted to the uprights so that the front end of the gate can be elevated to allow small stock, such as pigs and sheep, to pass under the same, but preventing the passage of larger animals, such as cattle and horses.

The object of the invention is to provide an improved roller support for the front end of the gate, which will have a kind of universal bearing by which it will accommodate itself to rough and uneven ground.

The invention consists in the novel construction and combination of parts, hereinafter fully described and claimed.

Figure 1:
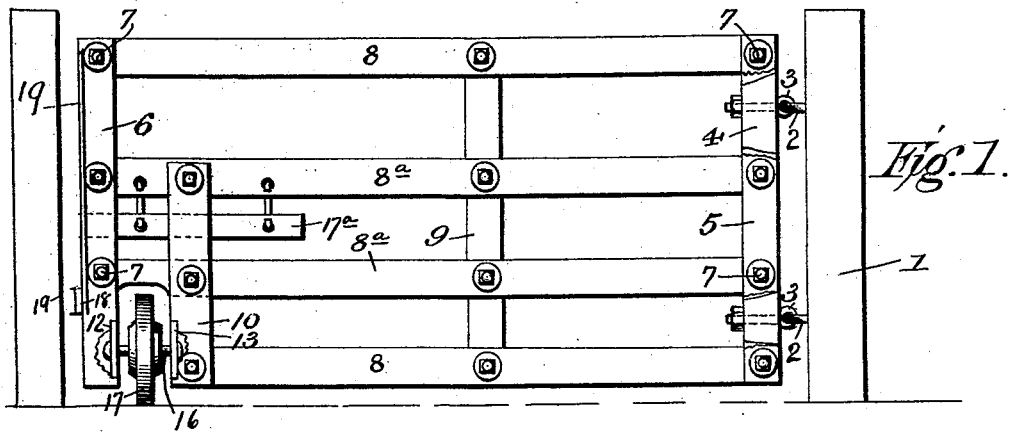
Figure 2:
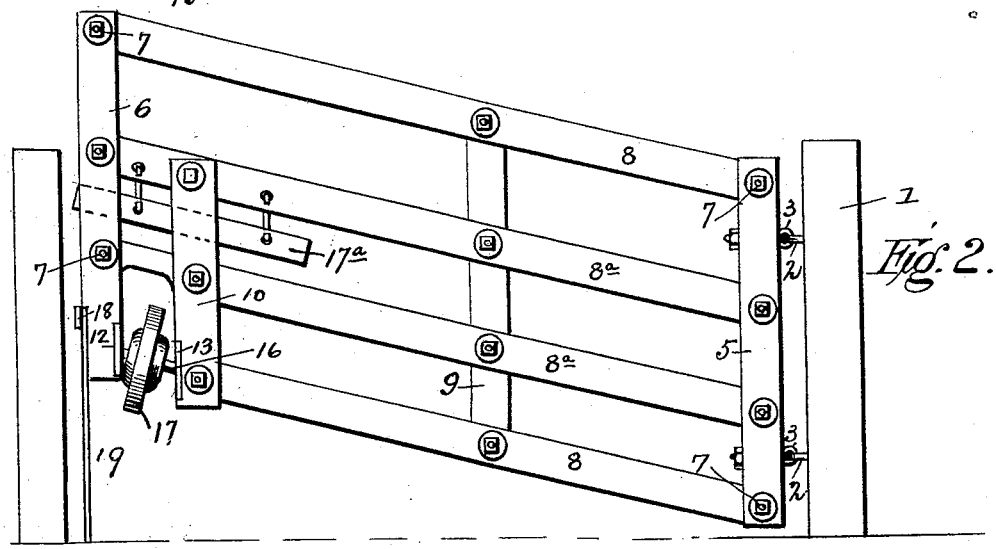
Figure 3:
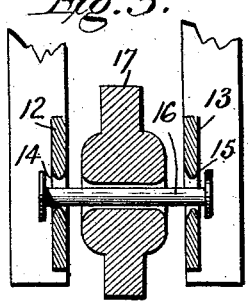
Figure 4:
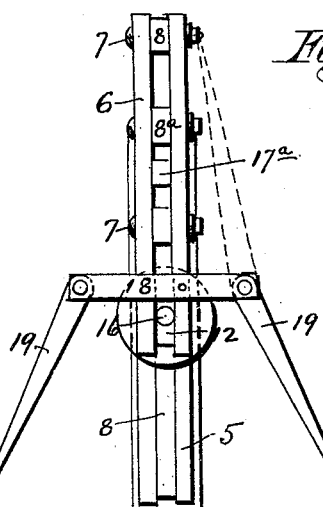

In the accompanying drawings: Figure 1 is a side elevation, partly broken away, of a gate constructed in accordance with my invention. Fig. 2 is a similar view, showing the front end of the gate elevated. Fig. 3 is a detail sectional view of the roller supports. Fig. 4 is a detail front view, showing the transverse bar secured to the front gate post, and the pivoted supporting legs for holding the gate in position, when elevated.

In the said drawings, the numeral 1 designates a standard or upright, which is properly secured in the ground, and is provided with eye-bolts 2, with which are connected corresponding eye-bolts 3, passing through blocks 4, secured between the rear uprights 5.

The numeral 6 designates the front uprights. These uprights each consist of two vertical bars secured together by means of bolts 7, with a space between to receive the ends of the horizontal bars 8, the said bolts forming the pivots of said bars.

The numeral 9 designates an intermediate vertical brace bar pivotally connected with the horizontal bars.

The lower or bottom horizontal bar 8, is cut-away at its front end, and to it and the intermediate bars $8^a$, are secured two vertical bars 10. To these bars 10, and the front uprights 6, are secured bearing plates 12 and 13, having holes 14 and 15 through which passes a headed pivot rod 16, upon which the roller 17 is loosely mounted. The hole 14 of the plate 12 on the gate uprights is somewhat larger than the rod 16, so that the front end of said rod has a universal play therein, capable of a vertical and a lateral movement, the hole 15 of plate 13 being countersunk on each side, so as to permit of such movements. The plate 13 is preferably made in two parts for convenience in inserting the rod in place.

The numeral 17 designates a latch pivotally connected with one of the bars $8^a$, and the numeral 18 designates a transverse bar secured to the front upright and having at each end a pivoted leg 19, which when turned down, when the gate is elevated, as seen in Fig. 4, will engage with the ground, and thus support the gate in its elevated position. When not in use the legs are turned up with their ends resting against said post.

Having thus described my invention, what I claim is—

In a farm gate of the character described, the combination of the plate secured to the front uprights having a hole therein, the plate secured to the vertical bars in rear of said uprights having a hole countersunk on both sides, the headed rod of smaller diameter than the hole in the plate secured to said front upright, the wheel or roller loosely mounted on said rod, the transverse bar secured to the front gate upright, and the supporting legs pivoted thereto, substantially as described.

In testimony that I claim the foregoing as my own I have hereunto affixed my signature in presence of two witnesses.

JESSE M. KEITH.

Witnesses:
CHRISTIAN W. RIES,
HENRY B. HERMANCE.